United States Patent [19]

Bhagavatula

[11] Patent Number: 4,750,802
[45] Date of Patent: Jun. 14, 1988

[54] OPTICAL FIBER DISPERSION COMPENSATOR

[75] Inventor: Venkata A. Bhagavatula, Big Flats, N.Y.

[73] Assignee: Corning Glass Works, Corning, N.Y.

[21] Appl. No.: 894,631

[22] Filed: Aug. 8, 1986

[51] Int. Cl.$^4$ .............................................. G02B 6/26
[52] U.S. Cl. ............................ 350/96.15; 350/96.16; 350/96.18; 350/96.33
[58] Field of Search ............... 350/96.15, 96.16, 96.18, 350/96.24, 96.27, 96.29, 96.30, 96.33

[56] References Cited

U.S. PATENT DOCUMENTS

| | | | |
|---|---|---|---|
| 3,837,727 | 9/1974 | Norton | 350/96.25 |
| 3,892,468 | 7/1975 | Duguay | 350/96.24 |
| 4,000,416 | 12/1976 | Goell | 350/96.3 X |
| 4,182,935 | 1/1980 | Chown | 350/96.15 X |
| 4,411,490 | 10/1983 | Daniel | 350/96.24 X |
| 4,465,336 | 8/1984 | Huber et al. | 350/96.3 |
| 4,516,832 | 5/1985 | Jain et al. | 350/96.24 |

FOREIGN PATENT DOCUMENTS 2023874 1/1980 United Kingdom ............ 350/96.18

Primary Examiner—John Lee
Assistant Examiner—John Ngo
Attorney, Agent, or Firm—William J. Simmons, Jr.

[57] ABSTRACT

The various wavelength components propagating in a transmission optical fiber are delayed different times. A conventional dispersion compensation system connects the transmitted signal to wavelength dispersor means which spatially separates the different wavelength components of the transmitted signal. Each wavelength component is then propagated by an optical fiber delay line the length of which is such that the delay line fibers substantially fully compensate for the differences in propagation times of the wavelength components in the transmission fiber. The amount of light collected by the delay line array can be increased and the "dead spots" due to cladding layers between adjacent fiber cores in the array can be eliminated by optimizing fiber shape and by employing staggered, multiple arrays. Also, lens arrays and/or masks can be employed at the input end of the delay line array to reduce or eliminate the cladding effects.

10 Claims, 2 Drawing Sheets

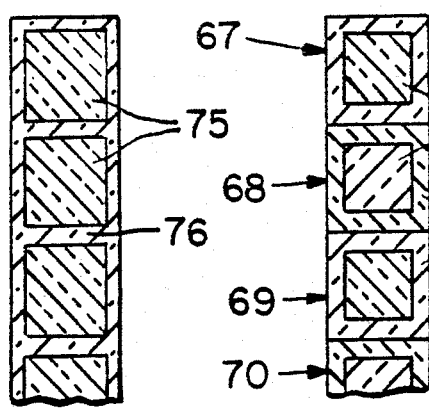
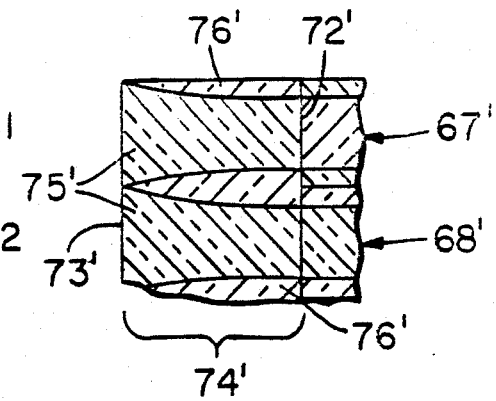
Fig. 7   Fig. 8   Fig. 9
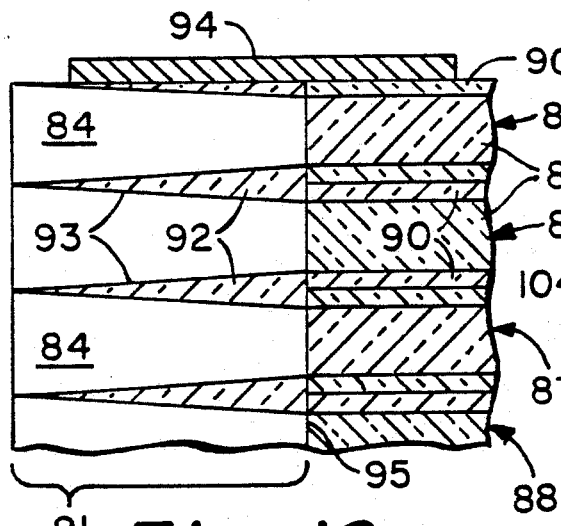
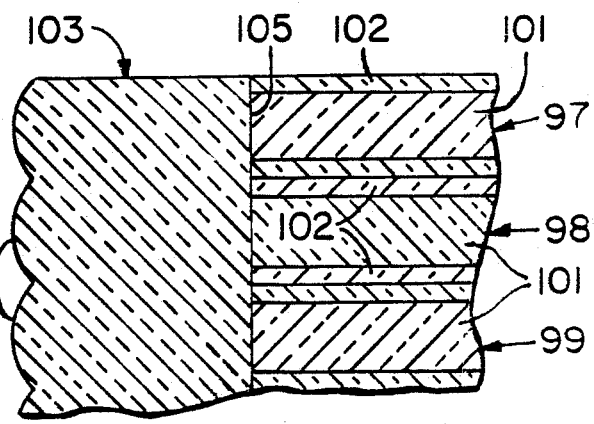
Fig. 10   Fig. 11
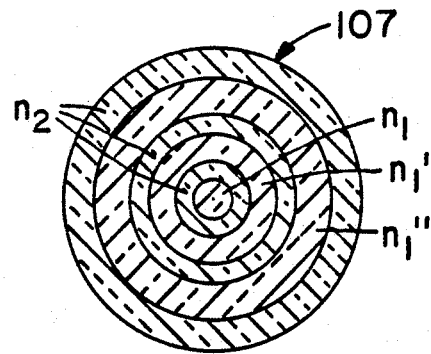
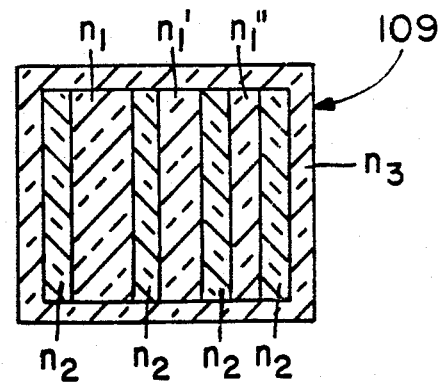
Fig. 12   Fig. 13

OPTICAL FIBER DISPERSION COMPENSATOR

CROSS-REFERENCE TO RELATED APPLICATIONS

This application is related to my copending U.S. patent applications Ser. No. 894,575 entitled "Dispersion Transformer Having Multichannel Fiber" and Ser. No. 894,579 entitled "Optical Fiber Dispersion Transformer" both filed on even date herewith.

BACKGROUND OF THE INVENTION

The present invention relates to the transformation or modification of dispersion in optical fiber transmission systems.

In single mode fibers, the delay time and hence dispersion, depends on wavelength. In general, light sources such as laser diodes have multiple wavelengths, and these different wavelengths travel at different speeds when propagating through a single-mode fiber. This leads to pulse broadening which depends on the source spectral width, the fiber dispersion and the length of the fiber. This pulse broadening can cause power to spread from one bit into an adjacent bit in a bit stream, an occurrence that can cause an error. The bit rate is therefore limited to that value beyond which bit error ratio is unacceptable. Initially, the procedure to overcome this problem was to put limitations on (a) the fiber dispersion, (b) the source wavelength and its spectral width and (c) the product of the bit rate times the repeater span length. These limitations can be relaxed if the delay differences introduced in the system can be compensated.

A system for compensating for dispersion in a single-mode system is disclosed in French Patent Publication No. 2,535,555. That system comprises a monochromator, an array of optical fiber delay lines and an optical signal detector. In a conventional manner, an optical signal generated by a source such as a laser diode is coupled to and transmitted through a single-mode transmission fiber. The monochromator receives the output light from the optical transmission fiber and spatially separates each longitudinal mode of the source. Each mode is injected into one of the short multimode fibers of the delay line array. The length of each short fiber is adjusted to compensate exactly the corresponding delay time induced in the link by its total chromatic dispersion. The ends of the short, delay line fibers converge on the photodetector.

The aforementioned compensator exhibits a dead space between adjacent cores of the delay line array. The multimode fibers of the delay line array include a layer of cladding material that constitutes a substantial part of the fiber. In addition, the fibers are of circular geometry. When such fibers are employed in the delay line array, a substantial part of the light directed thereon goes uncollected. For dispersion compensator applications, this type of array causes higher insertion loss; and more importantly, it causes additional bit errors in digital telecommunications applications. For example, in systems operating with Fabry-perot laser sources, mode partition noise is ever present. In such a system, if the mode containing a substantial part of the bit-energy falls on the cladding, information is lost. Even if the array is originally aligned to capture all of the laser modes, bit errors can occur if there is frequency shift due to temperature or chirping effects. By minimizing the cladding thickness, such adverse effects can be minimized but not eliminated.

It is not always desirable to minimize dispersion and maximize bandwidth. For example, a customer may purchase the sole use of a single-mode optical fiber transmission line and connect its own terminal equipment thereto. The cost of using the transmission line may be based on the maximum data rate that the customer intends to transmit. The bandwidth of the single-mode fiber transmission line may be much greater than that currently needed by the customer. A dispersion transformer similar to that disclosed in the aforementioned French Patent publication No. 2,535,555 can be employed to limit the bandwidth of the transmission line to that bandwidth for which the customer pays. This can be accomplished by utilizing the fiber delay line array to delay certain wavelengths received from the monochromator with respect to other wavelengths received therefrom so that the output pulse from the dispersion transformer is wider than the input pulse thereto.

The term "dispersion transformer" as used herein refers to those systems which minimize or decrease dispersion as well as those which increase dispersion.

SUMMARY OF THE INVENTION

An object of the present invention is to provide a dispersion transformer having improved light collection efficiency and reduced tolerance requirements. Another object is to provide a fiber array delay line dispersion transformer wherein bit errors caused by cladding effects are reduced or eliminated.

The present invention pertains to an optical transmission system of the type which comprises the serial arrangement of the following components: a light source, a light detector, at least one transmission optical fiber connected between the source and detector, and a dispersion transformer disposed between any two of the aforementioned components. The dispersion transformer is characterized in that it comprises a plurality of optical waveguide channels, each of which has a high refractive index signal propagating region, adjacent channels of high refractive index being separated by a cladding region of low refractive index. As used herein the term "optical waveguide channels" means the cores of an array of fibers or the light conducting regions of a single multichannel fiber such as that illustrated in FIG. 12 or FIG. 13. Each of the channels propagates an optical signal with a discrete delay time. Means is provided for receiving light from one of the components and dispersing or separating the light into a plurality of spatially separated beams, the position of each beam being a function of the velocity with which the light that forms the beam propagates through the transmission optical fiber. The spatially separated beams are directed toward the input ends of the optical waveguide channels, and the light that emanates from the channels is coupled to the next adjacent component of the system. Means is provided for preventing the loss of any of the spatially separated beams which would tend to fall upon the low refractive index cladding region between two adjacent channels.

In the aforementioned system, the means for preventing can comprise means for directing the light beams onto the optical waveguide channels, whereby substantially none of the light beams fall onto the low refractive index cladding region. More specifically, the means for directing can comprise an array of transition region optical fibers disposed in side-by-side relationship, the array having an input end face and an output endface. The spacially separated beams are directed upon the transition region input endface. The transition region output endface is situated adjacent the optical waveguide channels. Each of the transition region optical fibers has a transparent core region surrounded by a transparent cladding layer of lower refractive index than the transparent core. The transparent cores can have substantially the same size and shape as the optical waveguide channels at the output endface, or they could be smaller than the optical waveguide channels. The transparent cladding can have substantially the same size and shape as the optical waveguide channel cladding region at the array output endface. The thickness of the transparent cladding decreases with increasing distance from the output endface of the array to zero thickness at the input endface of the array. Each of the transition region cores has a cross-sectional area which increases with increasing distance from the transition region output endface.

The means for directing could also comprise a plate having a plurality of tapered apertures, one of the apertures being aligned with a respective one of the optical waveguide channels. The cross-sectional area of the apertures increases with increasing distance from the optical waveguide channels. The aperture-forming surfaces are light-reflective.

The means for directing could also comprise a plate of transparent material having an input end for receiving the spacially separated beams and an output end adjacent the optical waveguide channels. The input end has a plurality of lenses each of which focuses incident light upon a respective one of the optical waveguide channels. Similarly, an array of lenses may be employed.

The optical waveguide channels can comprise at least one linear array of optical fibers each having a core surrounded by a layer of cladding material. The optical fibers are preferably rectangular in cross-section. Further, there can be employed a plurality of linear arrays of optical fibers which are disposed immediately adjacent one another, each of the optical fibers having a rectangular core surrounded by a layer of cladding material. The cladding material in one array lies adjacent the core material of the next adjacent array.

The optical waveguide channels could also comprise a multi-segmented core optical fiber comprising a plurality of core segments separated by layers of refractive index having a lower refractive index than the core segments. The multi-segmented core optical fiber can be azimuthally symmetrical, whereby each of the core segments is annularly shaped. Alternatively, the multi-segmented core optical fiber can be slab-shaped in cross-section, each of the core segments being planar in shape.

BRIEF DESCRIPTION OF THE DRAWINGS

FIGS. 7 and 8 are cross-sectional views taken along lines 7—7 and lines 8—8, respectively of FIG. 6.

FIG. 9 is a cross-sectional view of a modification of the embodiment of FIG. 8 wherein the input transition region cores taper non-linearly.

FIG. 10 is a cross-sectional view of an array of conically-shaped reflectors adjacent the input endface of the delay line array.

FIG. 11 is a cross-sectional view of an array of lenses that is positioned adjacent the endface of the delay line array.

FIGS. 12 and 13 are cross-sectional views of multi-segmented core optical fibers which can be employed instead of the delay line array in FIG. 1.

DETAILED DESCRIPTION

Figure 1:
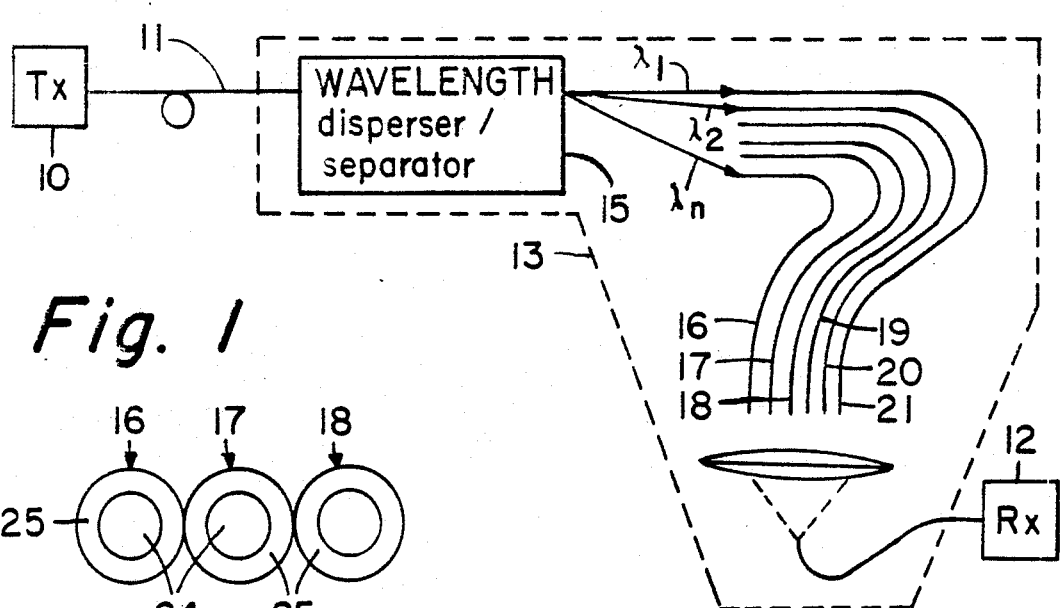
FIG. 1 is a schematic illustration of the dispersion transformer of the present invention.

The dispersion transformer of the present invention is shown in FIG. 1. Light from a transmitter 10 such as a laser diode or LED source is propagated through transmission optical fiber 11 which may comprise a single-mode or multimode fiber. In single-mode fibers, for example, the delay time and hence dispersion, depends upon wavelength. In general, laser diode sources emit light at multiple wavelengths and these different wavelengths travel at different speeds through fiber 11. If fiber 11 were coupled directly to receiver 12, the output pulse fed to the receiver would be broadened to an extent depending upon the source spectral width, the fiber dispersion and the length of fiber 11.

In accordance with one aspect of the invention, this pulse broadening can be minimized by introducing a dispersion transformer 13 into the system. Transformer 13 may be connected between transmission fiber 11 and detector 12, as shown in FIG. 1, or it could be connected between source 10 and fiber 11. If two or more transmission fibers were connected in series a dispersion transformer could be connected between two such fibers. Transformer 13 comprises wavelength disperser/separator means 15, which may consist of a passive optical device such as a grating, prism, filter, wavelength coupler, zone plate or the like or an active device such as an acousto-optic modulator or the like. Means 15 is capable of separating the optical signal emanating from fiber 11 into a plurality of spatially separated wavelength components. Three such components are represented by arrows in FIG. 1. Wavelength components $\lambda_1, \lambda_2, \ldots \lambda_n$ are incident on the core portions of the input endfaces of delay line fibers 16 through 21. In the embodiment illustrated in FIG. 1 it is assumed that wavelength component $\lambda_2$ a is delayed a greater amount in transmission fiber 11 than component $\lambda_1$, $\lambda_3$ is delayed a greater amount than $\lambda_2$, and $\lambda_n$ is delayed a greater amount than $\lambda_{n-1}$. Therefore, wavelength component $\lambda_1$ is injected into the longest delay line fiber 21, component $\lambda_2$ is injected into fiber 20 which provides slightly less delay than fiber 21 and so on so that component $\lambda_n$ is injected into the shortest delay line fiber 16. The length of each section of delay line fiber is adjusted so that the differences in propagation times in delay line fibers 16–21 substantially fully compensate for the differences in propagation times of the wavelength components in transmission fiber 11.

The preferred mode of operation described above effects minimal system dispersion. In accordance with another aspect of the invention, dispersion is increased in order to limit the data rate that can be transmitted by an optical fiber transmission system. For example, a single-mode optical fiber can be employed as the transmission fiber for a given customer. The bandwidth of the single-mode fiber may be larger than necessary to transmit the data rate for which the customer pays. The dispersion transformer of FIG. 1 can be employed to limit the bandwidth to the desired value. The wavelength component which has been delayed the greatest amount in the transmission fiber is delayed even further by multimode fiber 16. The width of the output pulse coupled to fiber 18 is thus even greater than the width of the pulse coupled to wavelength disperser/separator 15.

Figure 2:
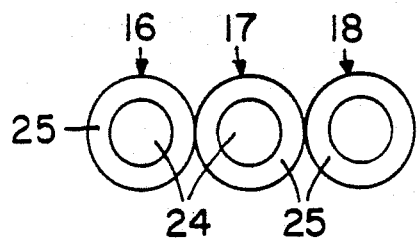
FIG. 2 is a cross-sectional view of a portion of an array of optical fibers which can be employed in the system of FIG. 1.

The input endfaces of some of the fibers of the delay line array are shown in FIG. 2. Delay line fibers 16–21 are generally formed of multimode fibers. As illustrated in FIG. 2 cladding layer 25 constitutes a substantial position of the fiber cross-section. In addition, conventional multimode fibers are of circular geometry. For fiber arrays employing such fibers, a substantial part of the incident light goes uncollected, thereby causing relatively high insertion loss. Also, if a wavelength component falls on cladding 25 rather than one of the cores 24, information is lost, possibly resulting in increased bit error rate. Even if the array is originally aligned so that the wavelength components associated with all of the laser modes fall on cores 24, a frequency shift caused by temperature or chirping effects can cause the position of a wavelength component to shift such that it falls on the cladding between two cores. This effect can be minimized but not completely eliminated by decreasing cladding thickness.

Figure 3:
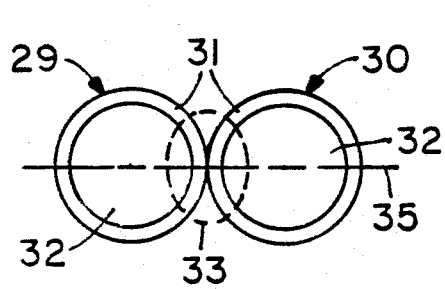
FIG. 3 shows a portion of a modified array of delay line fibers having a smaller ratio of cladding thickness to fiber diameter than the fibers of FIG. 2.

FIG. 3 shows the input endfaces of two adjacent delay line fibers 29 and 30 wherein some of the cladding has been etched from the end portions to form cladding layers 31 of reduced thickness. The following discussion pertains to those light sources which exhibit mode partition noise problems which result in most of the bit power residing in one mode or a few modes. The discussion assumes the existance of a single mode which results in the generation of a single wavelength component light beam 33 by means 15. Temperature change, for example, can cause beam 33 to fall partially on each of fibers 29 and 30. If the amount of light falling on cores 32 does not constitute some predetermined minimum percentage of the total area of beam 33, perhaps 50%, for example, the amount of power delivered to receiver 12 will not be sufficient to generate the proper bit.

Figure 4:
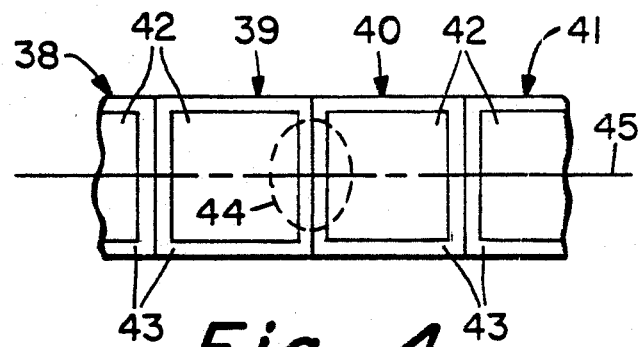
FIG. 4 shows an array of rectangularly-shaped delay line fibers.

The aforementioned disadvantage associated with the circular fiber array of FIG. 3 can be avoided by employing an array of square fibers 38–41 as shown in FIG. 4. Light beam 44 impinges upon the cladding region between fibers 39 and 40. However, since cores 42 are square, beam 44 is incident upon a greater portion of cores 42 of fibers 39 and 40 as compared with beam 33 of FIG. 3. Thus, even though the cladding thickness is identical in FIGS. 3 and 4, the fraction of the bit power lost in the cladding is significantly smaller in the embodiment of FIG. 4.

Figure 5:
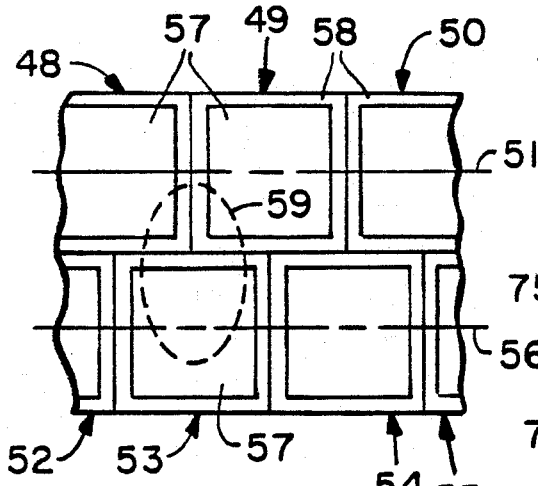
FIG. 5 shows two parallel arrays of rectangularly-shaped delay line fibers.

A further technique for reducing insertion loss and eliminating bit error losses associated with fiber cladding is illustrated in FIG. 5. Instead of one linear array of delay line optical fibers, two or more linear arrays are employed. The axes of fibers 48–50 (row No. 1) lie on center line 51 whereas the axes of fibers 52–55 (row No. 2) lie on center line 56. Additional rows would be row No. 3, row No. 4, etc. The fibers of rows Nos. 1, 3, etc. are staggered with respect to those of rows Nos. 2, 4, etc. The boundary between adjacent fibers of one row preferably lies at the midpoint of a fiber in adjacent rows. If only one row, eg. row No. 1, were employed, a significant portion of light beam 59 would be lost if it fell on the cladding between fibers 48 and 49. In a multiple row embodiment, the light can be focused so that when it falls on the cladding of row 1, it simultaneously falls on the core of a corresponding fiber in rows 2, 4, etc. Bit information is thus not completely lost. The lengths of the corresponding fibers in two adjacent rows are cut appropriately. For example, the length of fiber 53 would be midway between the lengths of fibers 48 and 49. This also allows for increased tolerances in focusing without degradation of performance.

The cladding thickness should be relatively small in order to minimize the amount of light lost when a portion of the wavelength components impinges upon the cladding portion of the endfaces of the delay line fibers. However, if the cladding thickness of the delay line fibers is too small throughout the length of the fiber, cross-talk will occur. This problem can be overcome by the embodiment illustrated in FIGS. 6, 7 and 8 wherein delay line fibers 67–70 are provided with an input transition region 66 in which cores 75 taper from a relatively large cross-sectional area at endface 73 down to an area that is about the same as that of cores 81 or smaller. The cladding layers 76 taper from a relatively small thickness or zero thickness at endface 73 to a greater thickness at interface 72. The size and shape of cores 75 and cladding layers 76 at interface 72 may substantially conform to the size and shape of the cores 81 and cladding layers 82. The cross-sectional area of each core 75 at endface 73 is shown as being about the same as the total cross-sectional area of the core and its cladding layer 76 at interface 72. Cores 75 could be made even larger at interface 73 to improve the light gathering capability of the input transition region and decrease tolerance requirements.

Light impinging upon endface 73 of the input transition region begins to propagate in one or more of the cores 75. Due to the reduction in diameter of cores 75 between endface 73 and interface 72, the light is channeled so that it impinges upon one or more of the cores 81 of the delay line array and not on the cladding 82 thereof.

Input transition region 66 could be formed of a single sheet of photosensitive material such as a photosensitive glass or plastic which is sensitive to a particular wavelength of light such ultraviolet, visible or the like or sensitive to electrons. A laser beam of the appropriate wavelength of light may be focused upon endface 72 of the plate of photosensitive material where it is desired to form one of the cores 75. The characteristics of the photosensitive material are such that the refractive index of the irradiated region becomes higher than that of the non-irradiated region. The shape of the focused laser beam is such that the beam diverges as it propagates through the photosensitive sheet. After one core 75 is formed, the laser beam is blocked and the sheet is moved so that the laser beam will impinge upon that region of endface 72 where the next adjacent core 75 is to be formed. This process is continued until the entire plate has been exposed and all of the cores 75 are formed. Regions 76 of unexposed material, which have a lower refractive index than regions 75, remain between and to the sides of cores 75. The thickness of the photosensitive plate and the extent of divergence of the laser beam are preferably such that low refractive index regions 76 taper to zero thickness at endface 73.

Figure 6:
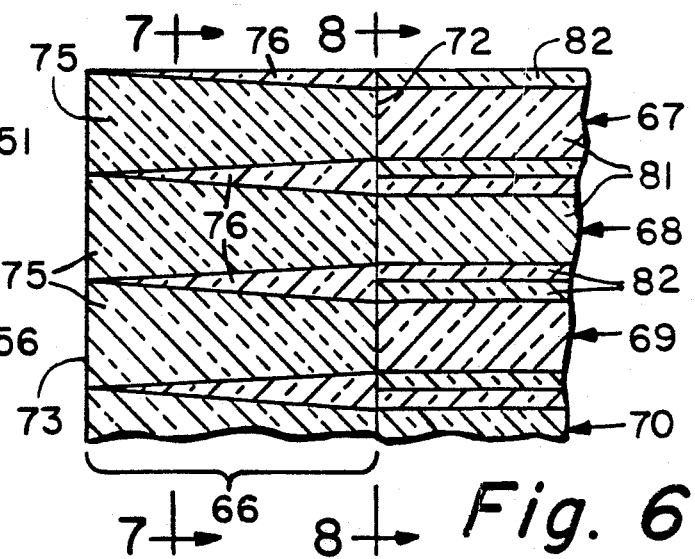
FIG. 6 is a cross-sectional view of a tapered core input transition region for directing input light onto the cores of the delay line array.

The embodiment of FIG. 6 could also be made by subjecting a sheet of glass of a first composition to a molding process whereby cavities are formed therein in those regions wherein cladding glass 76 is to be situated. Those cavities are then filled with a molten glass having a refractive index lower than that of the first composition. Endfaces 72 and 73 are then ground and polished. The glass plate to be used in the molding process could have a refractive index gradient such that the refractive index thereof at endface 72 is higher than that at endface 73. Such a gradient could be formed by subjecting a glass plate to an ion exchange process. The advantage of such a refractive index gradient is that the mode volume of the guide remains constant and thus eliminates any mode conversion losses.

In the modification illustrated in FIG. 9, elements similar to those of FIG. 6 are represented by primed reference numerals. This figure illustrates that the cross-sectional areas of cores 75' may vary nonlinearly between endface 73' and interface 72'. This nonlinear taper may inherently occur in the process of forming input transition region 74' from photosensitive material due to the diffusion of light as it passes through that material. The structure of FIG. 9 could also be formed by employing an appropriately shaped mold.

The input transition region 91 of FIG. 10 contains tapered cavities 84 which are formed by tapered sidewalls 92. The sidewalls taper to zero thickness at the input end of transition region 91. The cross-sectional area of cavities 84 is about equal to or smaller than that of the cores 89 of fibers 85–88 at interface 95. Wavelength components of light entering the large end of cavities 84 reflect from sidewalls 92 and are directed into cores 89.

Input transition region 91 can be formed by molding a material such as glass, metal, plastic or the like. A metal such as nickel may possess the required light reflecting properties. Although materials such as glass and plastic may reflect a major portion of the light rays incident thereon at low angles of incidence, it may be desirable to coat sidewalls 92 with a light-reflecting layer (not shown) of gold, silver or the like.

Cavities 84 of FIG. 10 could also be formed by etching an appropriately exposed sheet of photosensitive material by a technique such as that described in conjunction with FIG. 6; a laser beam could be focused multiple times on a sheet of photosensitive material where cavities 84 are to be formed. The photosensitive material is then subjected to an etching treatment which preferentially removes the exposed photosensitive material and leaves sidewalls 92.

The input transition region 103 of FIG. 11 consists of a plate of transparent material having lenses 104 molded or otherwise formed on one surface thereof. The surface 105 opposite lenses 104 is secured to the endface of the array of fibers 97–99 each of which comprises a core 101 and cladding layer 102. Lenses 104 are aligned with the axes of fibers 97–99 so that light directed on transition region 103 is focused onto cores 101.

The cross-sectional areas of the cores of the delay line array fibers of FIGS. 6–11 and the cross-sectional shapes of the input transition regions of FIGS. 6–10 could be any shape including circular. If the input device channels or focuses the wavelength components to an area that is the same as or smaller than the area of a delay line fiber core, the shape of that core is immaterial.

Whereas the previously described embodiments employ discrete fibers in the delay line array, a single fiber having a plurality of discrete light-conducting channels could also be employed. Two such embodiments, which are illustrated in FIGS. 12 and 13, are described in greater detail in my aforementioned copending U.S. patent application Ser. No. 894,575.

In the embodiment of FIG. 12 a central region of refractive index n and annular regions of refractive index $n_1'$ and $n_1''$ are separated by annular regions of refractive index $n_2$, where $n_2$ is less than $n_1$, $n_1'$, and $n_1''$. The amount of delay to which a signal is subjected in each of the channels $n_1$, $n_1'$ and $n1''$ depends upon the refractive index, the radius and the width of that channel.

In the embodiment of FIG. 13 fiber 109 comprises parallel laminae of refractive index $n_1$, $n_1'$ and $n_1''$ separated by laminae of refractive index $n_2$, where $n_2$ is less than $n$, $n_1''$ and $n_1''$. The aforementioned laminae can be surrounded by a cladding layer of refractive index $n_3$, wherein $n_3$ is preferably equal to or greater than $n_2$ but less than $n_1$, $n_1''$ and $n_1''$.

The fibers of FIGS. 12 and 13 can be provided with input transition regions similar to those of FIGS. 6–11 which function to channel or focus light onto the high refractive index light conducting channels or cores of those fibers. For example, a lens system of the type shown in FIG. 11 could be used as an input device for the fiber of FIG. 12. The lens system could comprise a plurality of annular lenses, one aligned with each of the light conducting channels. Light from the wavelength dispersion/separator which impinged on such a lens system would be focused onto the light conducting channels, substantially none of that light falling on the low refractive index regions. In a similar manner, fiber 109 of FIG. 13 could be provided with a system of cylindrical lenses.

I claim:

1. In an optical transmission system comprising the serial arrangement of the following components
   a light source,
   a light detector,
   at least one transmission optical fiber connected between said source and detector, and
   a dispersion transformer disposed between any two of the aforementioned components,
said dispersion transformer being characterized in that it comprises
   a plurality of optical waveguide channels, each of said channels having a high refractive index signal propagating region, adjacent channels of high refractive index being separated by a cladding region of low refractive index, each of said channels propagating an optical signal with a discrete delay time or narrow range of delay times,
   means receiving light from one of said components and dispersing said light into a plurality of spatially separated beams, the position of each said beam being a function of the wavelength thereof and therefore a function of the velocity with which the light that forms said beam propagates through said at least one transmission optical fiber, shifting of the array of beams therefore occurring when the frequency of said source shifts due to temperature change or the like, said spatially separated beams being directed toward the input ends of said optical waveguide channels, the light emanating from said channels being coupled to the next adjacent component of said system, and means for directing each of said spatially separated beams onto a respective one of said optical waveguide channels, substantially none of said light beams falling onto said low refractive index cladding region.

2. An optical transmission system in accordance with claim 1 wherein said means for directing comprises an array of transition region optical fibers disposed in side-by-side relationship, said array having an input endface and an output endface, said spatially separated beams being directed upon said transition region input endface, said transition region output endface being situated adjacent said optical waveguide channels, each of said input optical fibers having a transparent core surrounded by a transparent cladding layer of lower refractive index than said transparent core, said transparent cores having substantially the same size and shape as said optical waveguide channels at said output endface, the cross-sectional area of said transparent cores increasing with increasing distance from said transition region output endface said transparent cladding having substantially the same size and shape as said optical waveguide channel cladding region at said array output endface, the thickness of said transparent cladding decreasing from said output endface of said array to zero thickness at said input endface of said array.

3. An optical transmission system in accordance with claim 1 wherein said means for directing comprises a plate of transparent material having an input end for receiving said spatially separated beams and an output end adjacent said optical waveguide channels, said input end having a plurality of lenses, each of which focuses incident of light upon a respective one of said optical waveguide channels.

4. An optical transmission system in accordance with claim 1 wherein said means for directing comprises a array of lenses, each of which focuses incident light upon a respective one of said optical waveguide channels.

5. An optical transmission system in accordance with claim 1 wherein said optical waveguide channels comprise at least one linear array of optical fibers each having a core surrounded by a layer of cladding material.

6. An optical transmission system in accordance with claim 5 wherein said optical fibers are rectangular in cross-section.

7. An optical transmission system in accordance with claim 1 wherein said optical waveguide channels comprise a plurality of linear arrays of optical fibers which are disposed immediately adjacent one another, each of said optical fibersnother, having a rectangular core surrounded by a layer of cladding material, the cladding material of two adjacent cores in one array lying adjacent the center of a core of the next adjacent array.

8. An optical transmission system in accordance with with claim 1 wherein said optical waveguide channels comprise a multi-segmented core optical fiber having a plurality of core segments separated by layers of cladding material having a lower refractive index than said core segments, said core segments being characterized in that adjacent ones thereof propagate light energy with different delay times.

9. An optical tranmission system in accordance with claim 8 wherein said multi-segmented core optical fiber is azimuthally symetrical, each of said core segments being annularly shaped.

10. An optical transmission system in accordance with claim 8 wherein said multi-segmented core optical fiber is slab-shaped, each of said core segments being planar in shape.

* * * * *